Oct. 6, 1953  W. E. BENEDICT ET AL  2,654,415
METHOD AND MACHINE FOR MAKING INLAID PRODUCTS
Filed Aug. 9, 1951  8 Sheets-Sheet 1
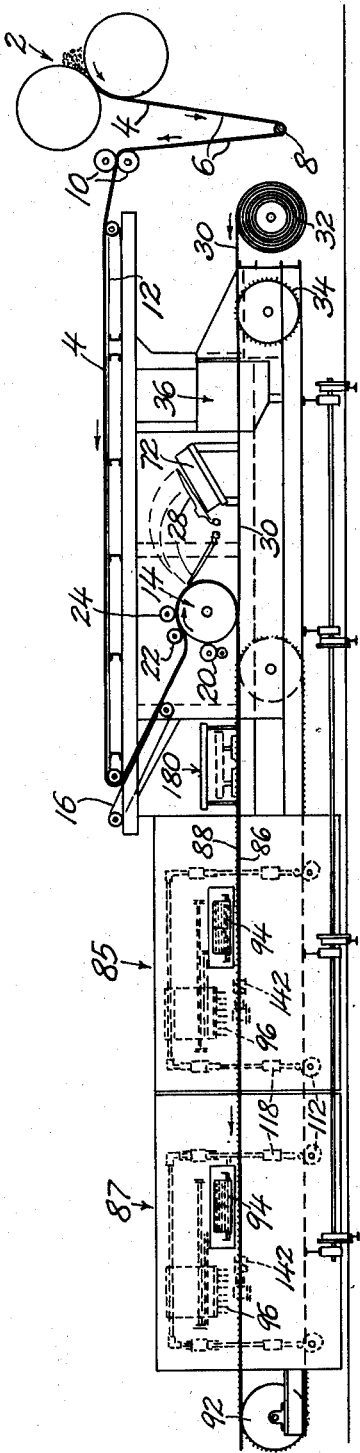
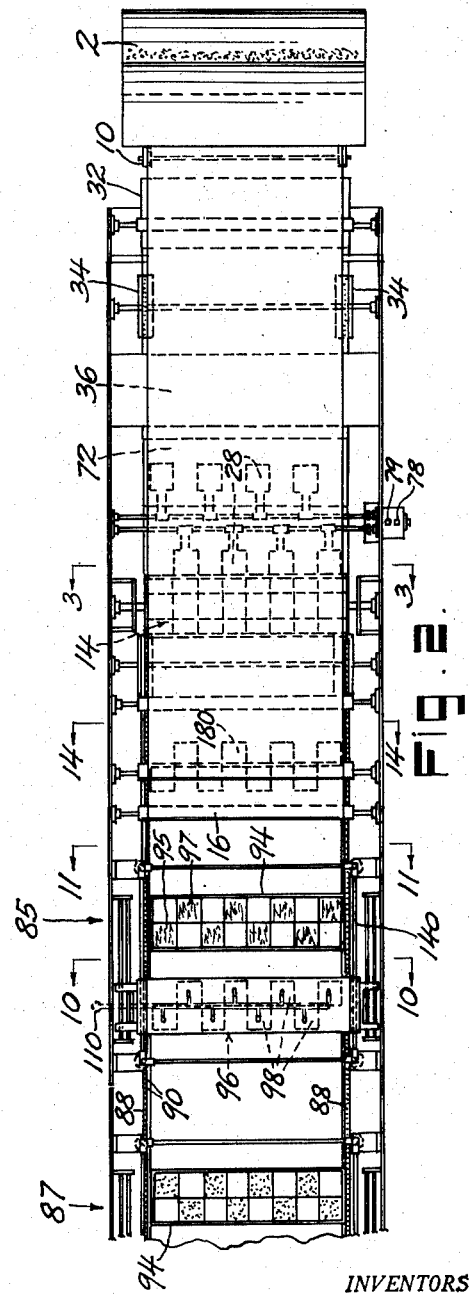
INVENTORS
WALTER E. BENEDICT
BY JOSEPH G. VAN SCIVER
Albert Sperry
ATTORNEY

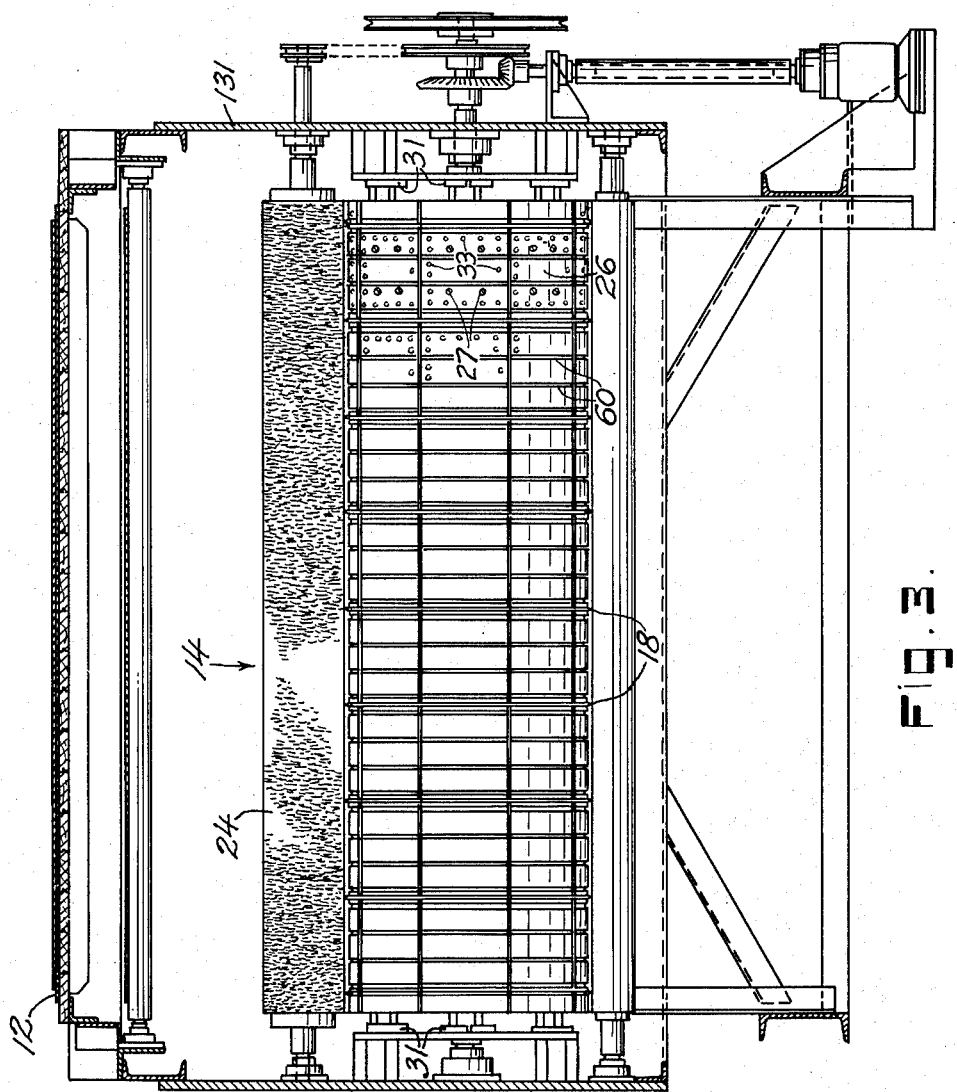

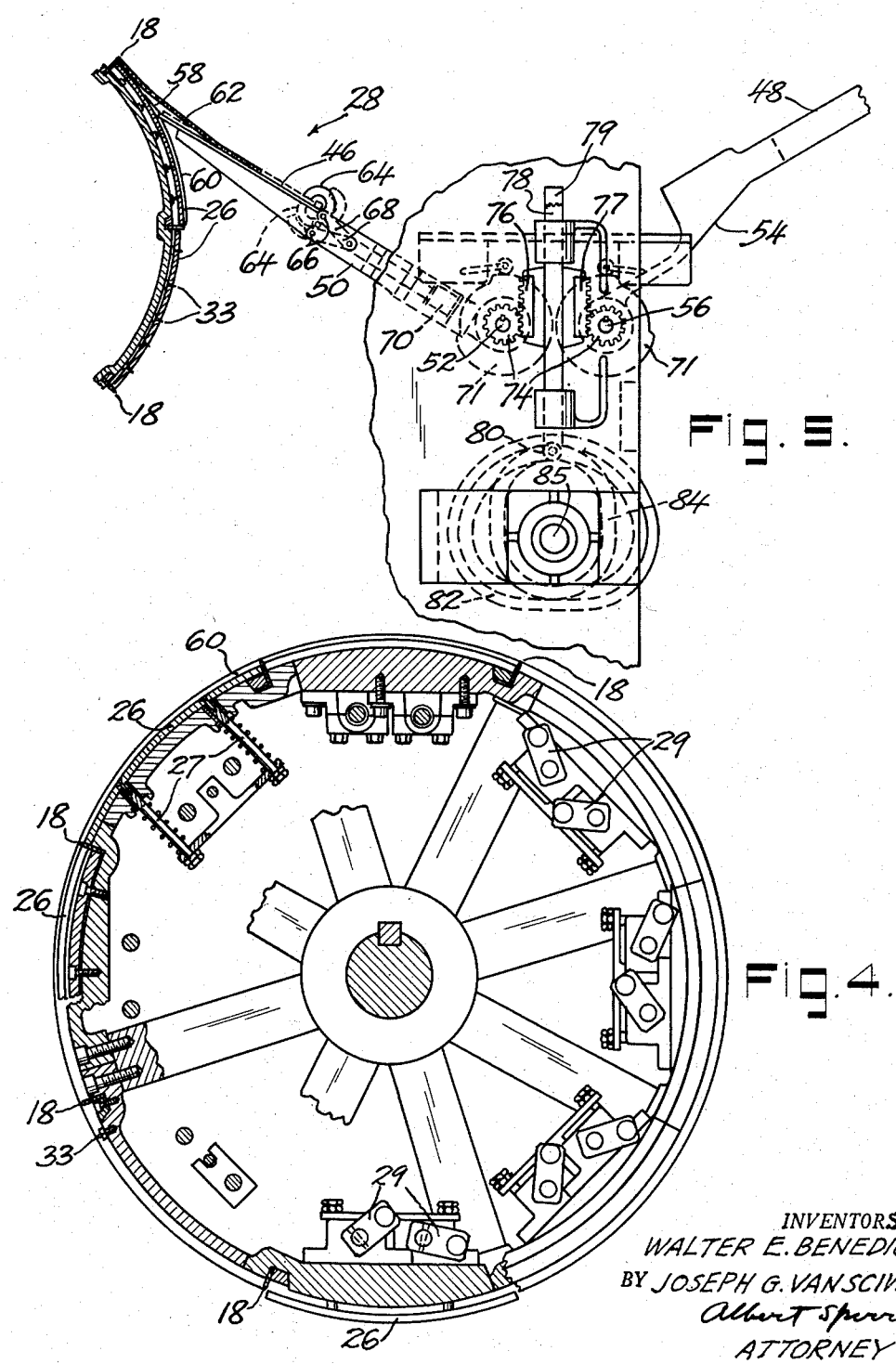

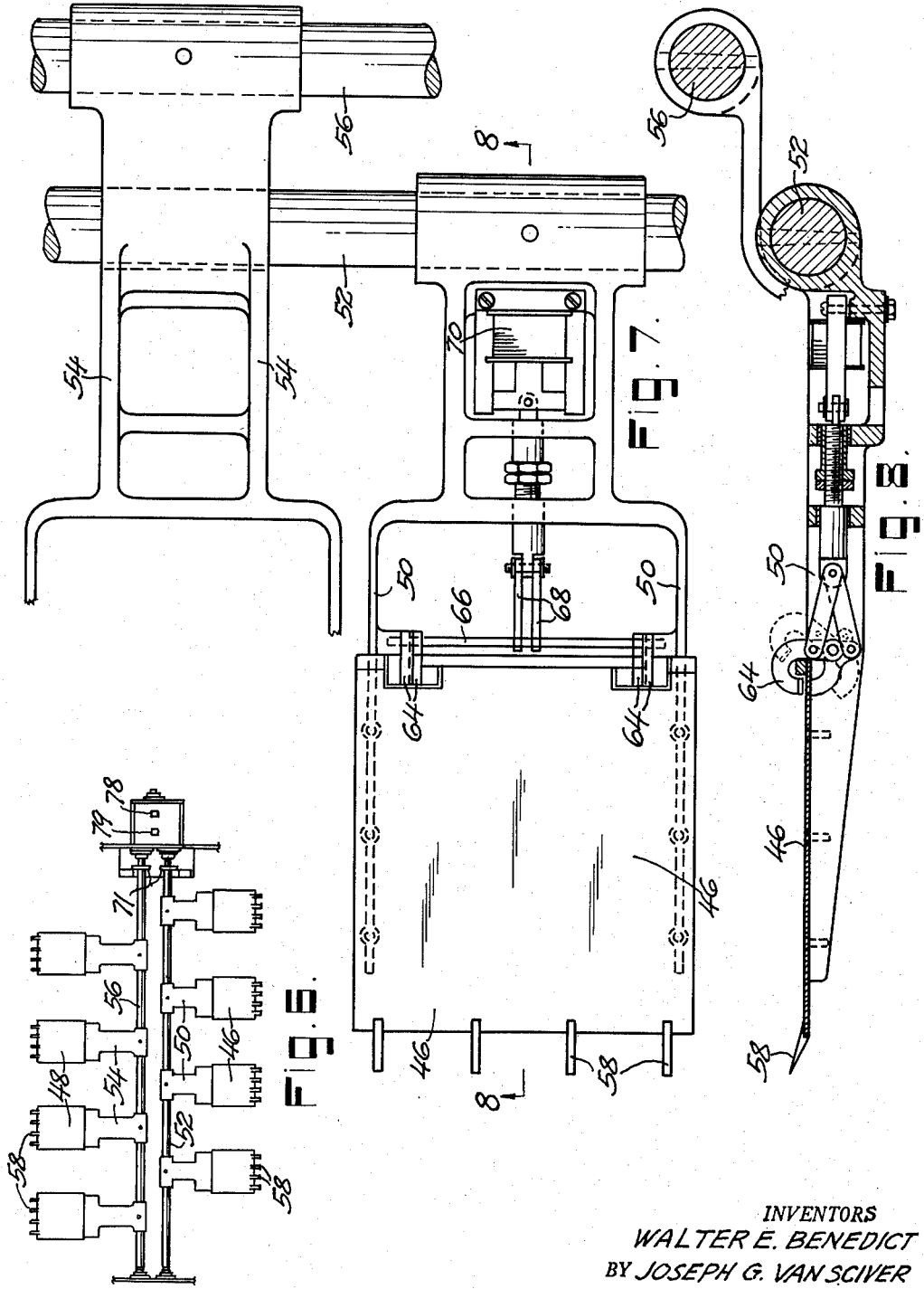

INVENTORS
WALTER E. BENEDICT
BY JOSEPH G. VAN SCIVER
Albert Sperry.
ATTORNEY

Oct. 6, 1953  W. E. BENEDICT ET AL  2,654,415
METHOD AND MACHINE FOR MAKING INLAID PRODUCTS
Filed Aug. 9, 1951  8 Sheets-Sheet 6
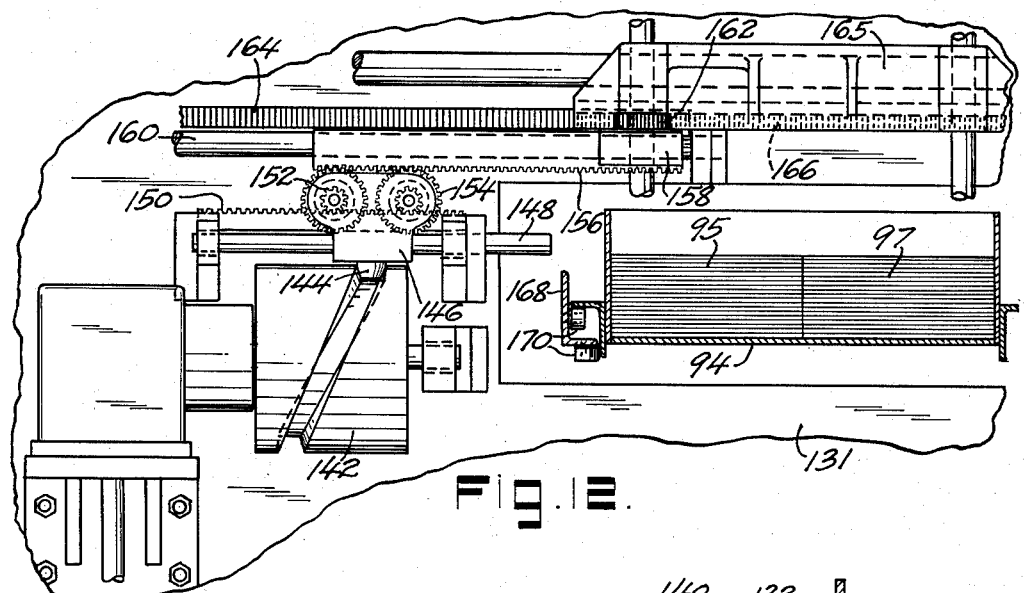
Fig. 12.
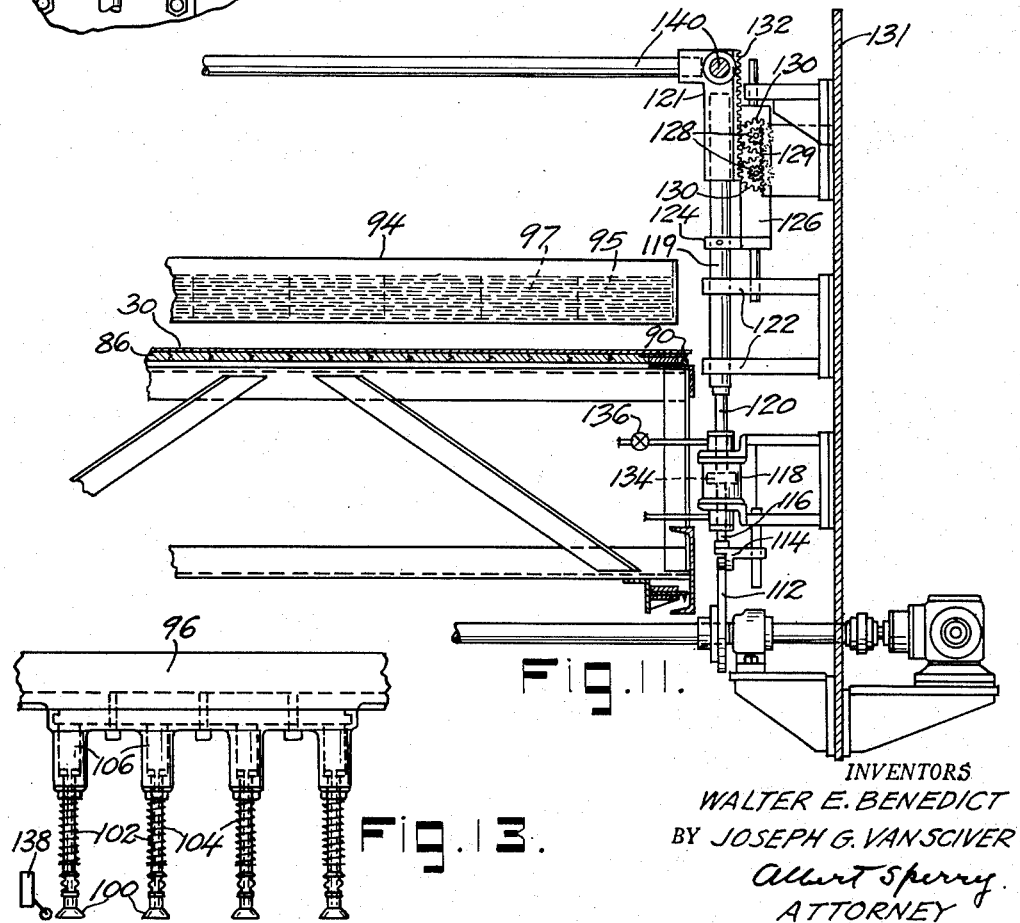
Fig. 11.
Fig. 13.
INVENTORS
WALTER E. BENEDICT
BY JOSEPH G. VAN SCIVER
Albert Sperry
ATTORNEY

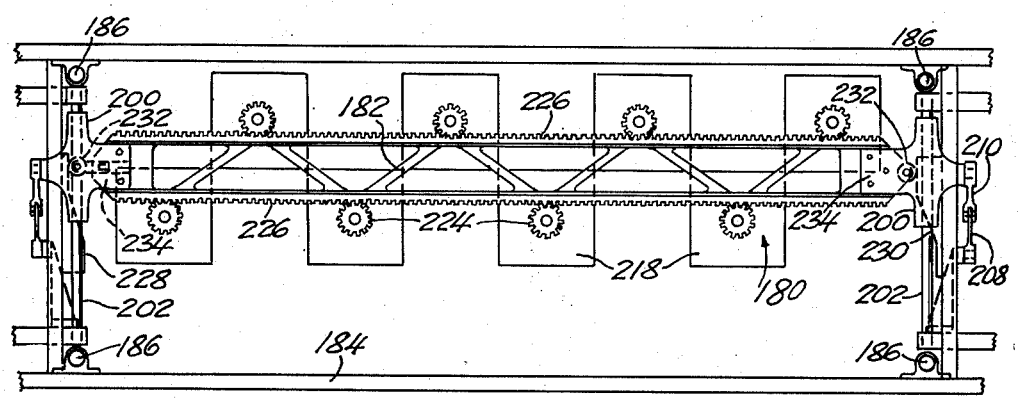
Fig. 15.
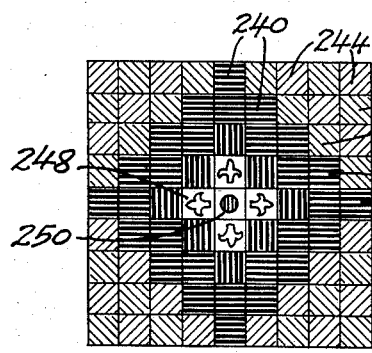
Fig. 17.
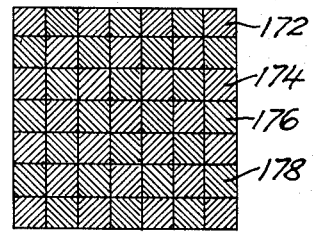
Fig. 18.
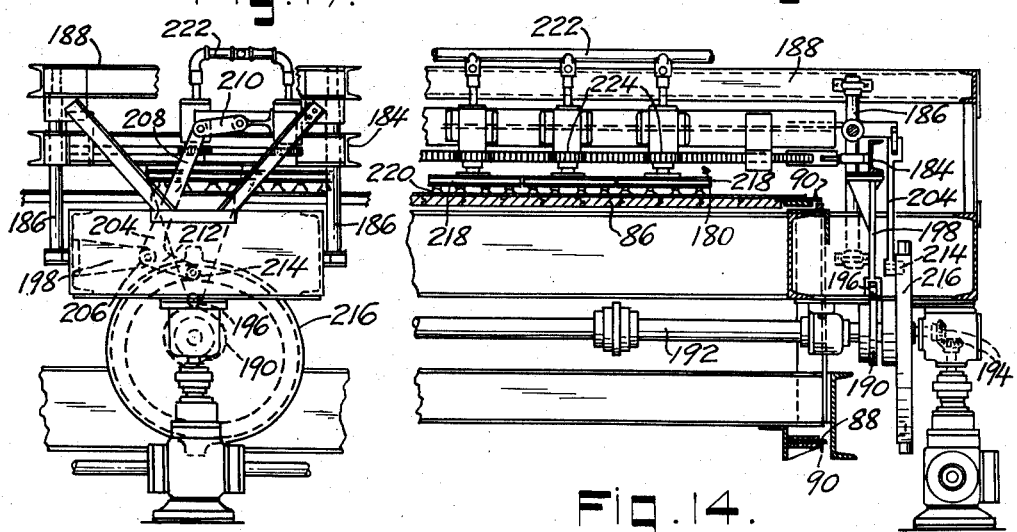
Fig. 16.
Fig. 14.
INVENTORS
WALTER E. BENEDICT
BY JOSEPH G. VAN SCIVER
Albert Sperry.
ATTORNEY Patented Oct. 6, 1953

2,654,415

UNITED STATES PATENT OFFICE 2,654,415

METHOD AND MACHINE FOR MAKING INLAID PRODUCTS

Walter E. Benedict, Newton, and Joseph G. Van Sciver, Philadelphia, Pa., assignors, by mesne assignments, to Congoleum-Nairn Inc., Kearny, N. J., a corporation of New York Application August 9, 1951, Serial No. 241,128

20 Claims. (Cl. 154—24)

1

This invention relates to machines for use in producing inlaid linoleum and similar products and particularly products having straight line inlaid designs.

Straight line inlaid linoleum is generally made up of pieces or blocks of linoleum composition which are bonded to a layer of backing material with the cut edges of the pieces in contact so as to provide a sharp outline for the different elements of the design. The pieces are usually cut from calendered sheets of linoleum composition and are arranged on the backing material by hand or by machine, after which the assembly is subjected to heat and pressure to secure the pieces to the backing and to cause the edges of the pieces to be forced together into intimate and bonding contact.

When the cut pieces of composition are arranged in place by hand the design may be varied frequently and at no great expense. However, the method is necessarily slow and ordinarily is intermittent in operation. Machines heretofore used for cutting and assembling pieces of linoleum composition in forming inlaid designs have generally been capable of continuous operation but they have been extremely expensive to produce and operate and have been so complicated that changes in design can be made only infrequently.

In accordance with the present invention a new type of machine is provided for cutting and assembling pieces of linoleum composition to produce straight line inlaid designs. The machine is continuous in operation but permits ready change in design. These results are preferably attained by providing the machine with novel means for selecting and arranging cut pieces of linoleum composition in predetermined positions and in varied relation on a support or backing material. The machine is particularly useful in producing designs which embody squares, tiles or other symmetrical elements and for this purpose preferably includes means for removing selected elements cut from a sheet of composition together with means for inserting other elements in place of those removed. The mechanism further includes means which serve to lift and rotate selected design elements and to orient them with respect to other elements of the design. These various elements may be used separately or in combination to produce a wide variety of designs.

One of the objects of the present invention is to provide a new type of machine for producing straight-line inlaid linoleum in a continuous operation while permitting the design to be changed readily and economically.

2

Another object of the invention is to provide an inlaying machine by means of which selected elements may be lifted from an assembly and replaced by other elements.

Another object of the invention is to provide means whereby elements removed from an assembly may be rotated through a predetermined angle and replaced in the assembly so that such elements may be oriented in position with respect to other elements of the design.

A particular object of the invention is to provide a machine for arranging squares or blocks of linoleum composition in varied predetermined relations and in a continuous operation to produce a tile simulating design in an inlaid linoleum product.

These and other objects and features of the present invention will appear from the following description thereof in which reference is made to the figures of the accompanying drawings.

In the drawings:

Fig. 1 is a diagrammatic side elevation of a typical machine embodying the present invention;

Fig. 2 is a top plan view of the machine illustrated in Fig. 1;

Fig. 3 is a vertical sectional view through the machine shown in Figs. 1 and 2 taken on the line 3—3 of Fig. 2 and showing the rotary cutter in elevation;

Fig. 4 is a vertical sectional view through the rotary cutter shown in Fig. 2;

Fig. 5 is a detail view partly in section showing the stripper mechanism employed in the machine of Fig. 1;

Fig. 6 is a top plan view showing the arrangement of the stripper members of Fig. 5;

Fig. 7 is an enlarged plan view of one of the stripper members;

Fig. 8 is a sectional view of the construction shown in Fig. 7 taken on the line 8—8 thereof;

Fig. 11 is a vertical sectional view taken on the line 11—11 of Fig. 2 illustrating the vertical lifting mechanism for the transfer device;

Fig. 12 illustrates details of the construction shown in Figs. 10 and 11;

Fig. 13 is a vertical sectional view through the suction head of the transfer device shown in Fig. 10;

Fig. 14 is a vertical sectional view through the machine of Fig. 1 showing a preferred form of element rotating mechanism;

Fig. 15 is a plan view of the construction illustrated in Fig. 14;

Fig. 16 is an end view of the construction in Figs. 14 and 15;

Figs. 17 and 18 are plan views showing alternative types of floor covering that may be produced when using the machine illustrated in Fig. 1.

Figure 9:
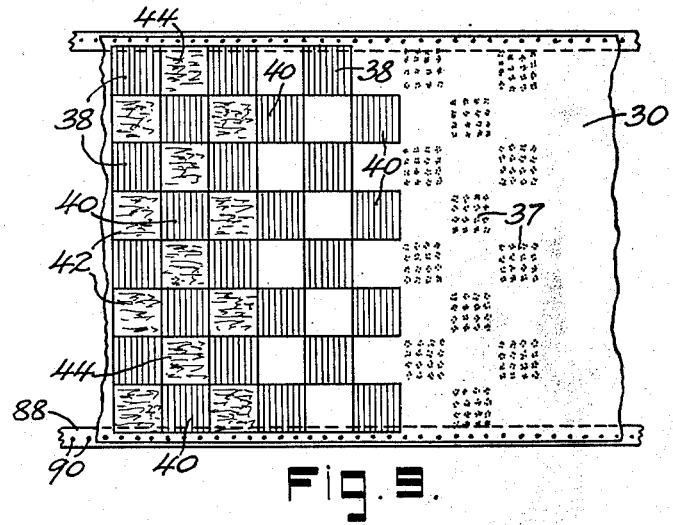
Fig. 9 is a diagrammatic plan view of a typical product produced by the machine of Fig. 1 showing successive stages of production.

In that form of the invention chosen for purposes of illustration in the drawings the machine is positioned in line with a calender 2 by which linoleum composition is formed into a sheet 4 from which pieces are to be cut to form design elements for use in the finished product. The sheet 4 preferably passes from the calender in the form of a loop 6 in which a control member 8 rides to vary the speed of operation of the machine, or of the calender, or both to coordinate their operation.

From the loop 6 the composition sheet passes to marginal trimmers 10 and onto a feeding conveyor 12 from which it passes down inclined conveyor 16 to a rotary cutter 14.

The rotary cutter may be of conventional type whereby pieces, blocks or elements may be cut from the composition sheet and ejected onto a supporting surface such as the travelling web of backing material. As shown in Figs. 3, 4 and 5 the surface of the cutter is provided with radially projecting knives 18 which define the shape of the design elements to be cut from the composition sheet. The knives and surface of the cutter are usually lubricated by means of a brush or roll 20 (Fig. 1) and the sheet to be cut is passed between the cutting knives and a cooperating roll 22. The sheet is thus cut through substantially its entire thickness but the final finishing cut is preferably effected by means of a stiff rotating brush 24 which presses the composition against the blades and completes the severance of the elements from the sheet without injury to the blades 18 and roll 22 which would result if the composition were completely severed by actual contact between the blades and roll.

As the rotary cutter continues in its rotation the fully cut pieces which are not required for the pattern being produced are ejected from the face of the cutter by ejecting plates 26 which are actuated by push rods 27 movable by links 29 under control of the end cams 31 shown in Fig. 3 in a manner well known in the art. The ejecting plates are thus raised from the surface of the cutter and the cut pieces of linoleum which are to be removed are held in position to be lifted from the ejecting plates by stripper means 28. Those elements required for the design being produced are held in the face of the ejecting plates which are not raised by means of pins 33 and are thereafter deposited on a supporting surface such as a web backing material 30 as the rotary cutter continues to rotate and on reaching the lowermost point of the cutter.

The backing material, which may be asphalt saturated felt, burlap or other sheet material, is supplied from a roll 32 and passes into contact with a pin roll 34 which serves to grip and advance the web beneath an adhesive applying device indicated generally at 36. The latter device deposits adhesive on the upper face of the web 30 in locations such as 37 in Fig. 9 corresponding to those locations in which design elements remaining on the rotary cutter are to be positioned on web. The web in passing beneath the rotary cutter is contacted by the cut pieces ejected from the pin 33 on the rotary cutter 14 by the ejecting plates 26. These pieces are deposited accurately on the adhesive causing them to adhere to the web and be held thereon in predetermined locations.

When producing a design such as that represented by Fig. 9 alternate squares or tile simulating elements are removed from the rotary cutter by the strippers 28 and squares or tile of a different color are inserted into the empty spaces on the backing 30 between the pieces which are deposited by the cutter an secured to the backing by adhesive. Thus the squares 38 and 40 in Fig. 9 may be those cut from the sheet 4 and deposited on the backing, whereas the squares 42 and 44 may be those inserted into spaces from which squares are removed from the rotary cutter by the strippers 28. The squares 38 and 40 may be red, for example, and be cut from a sheet 4 of red calendered linoleum, whereas the squares 42 and 44 may be of a different or contrasting color and may be cut from other previously calendered sheets or produced in any other way as by flat pressing of granular linoleum composition or the preassembling of elements for forming a figured insert or medallion.

The strippers 28 which remove the cut squares of composition from the rotary cutter are shown in Fig. 6 as arranged for alternate operation to remove alternate pieces of composition in forming the tile simulating design of Fig. 9. The stripper plates 46 are carried by arms 50 mounted on the shaft 52, whereas the stripper plates 48 are carried by arms 54 mounted on shaft 56. Inclined guide fingers 58 project from the front edge of each plate and are positioned to project into grooves 60 on the ejecting plates 26 when these plates are raised to lift the cut pieces of composition 62 from the pins 33 on the rotary cutter. As the roll 14 rotates the cut piece of composition 62 rides up the fingers 58 onto the upper face of the stripper plate 46 until it reaches the dotted line position of Fig. 5 in which it is held by the gripping members 64.

The gripping members 64 are pivotally mounted at 66 and are oppositely movable by the links 68 actuated by solenoid 70 or other suitable means under control of the cam 71 on shaft 52. The gripping members are separated as a cut piece slides into place and thereafter are closed to the full line position of Fig. 8 to hold the cut pieces of composition 62 in place while lifting it from the rotary cutter.

The stripper arms 50 and 54 are alternately moved through arcs from receiving positions shown in Fig. 5 in which they strip cut pieces of composition from the rotary cutter to discharge positions in which the ejected cut pieces are each inverted and deposited on a tray 72 shown in Fig. 1. The set of strippers carrying plates 46 are moved together to receive spaced squares in a row transversely of the sheet being cut, whereas the set of strippers carrying the plates 48 move between the plates 46 and in timed relation to receive the alternate spaced pieces from an adjacent transverse row of the sheet. As each plate is moved into position to deposit its piece on the tray 72 the gripping member 64 is moved to its dotted line position so that the cut piece is released and deposited on the tray leaving the stripper ready to receive and remove another cut piece when the shafts 52 and 56 are rotated in the opposite direction.

The shafts 52 and 56 are actuated by suitable means such as the pinions 74 on the ends of the shafts engaging oppositely facing racks 76 and 77 on the reciprocating bars 78 and 79 respectively. The latter bars each carry a roller 80 and the roller on bar 78 rides in cam slot 82 while the roller on bar 79 rides in cam slot 84. These cams are driven together by shaft 85 from the main drive shaft or elsewhere in timed relation to the rotation of the rotary cutter 14. In this way the strippers are moved to receive selected cut pieces and remove them from the rotary cutter and deposit them on tray 72 for future use or reworking of the composition, whereas the cut pieces remaining on the rotary cutter are ejected onto the backing 30 and held in place by the adhesive as shown at 38 and 40 in Fig. 9. It will be obvious of course that the shape of the cams and the shape and location of pieces of composition cut from the calendered sheet may be varied to remove any number and type of pieces from the rotary cutter and to cause the remaining cut pieces to be deposited in predetermined locations on a travelling support or web of backing material to produce any type of pattern desired.

The backing carrying the pieces 38 and 40 passes from the rotary cutter 14 to the table 86 over which travel pin bands 88 adjacent opposite edges of the table. The pins 90 penetrate the marginal edges of the web of backing and the pin bands are advanced continuously by the pin band drive roll 92 to move the web through the machine to the discharge end thereof.

Figure 19:
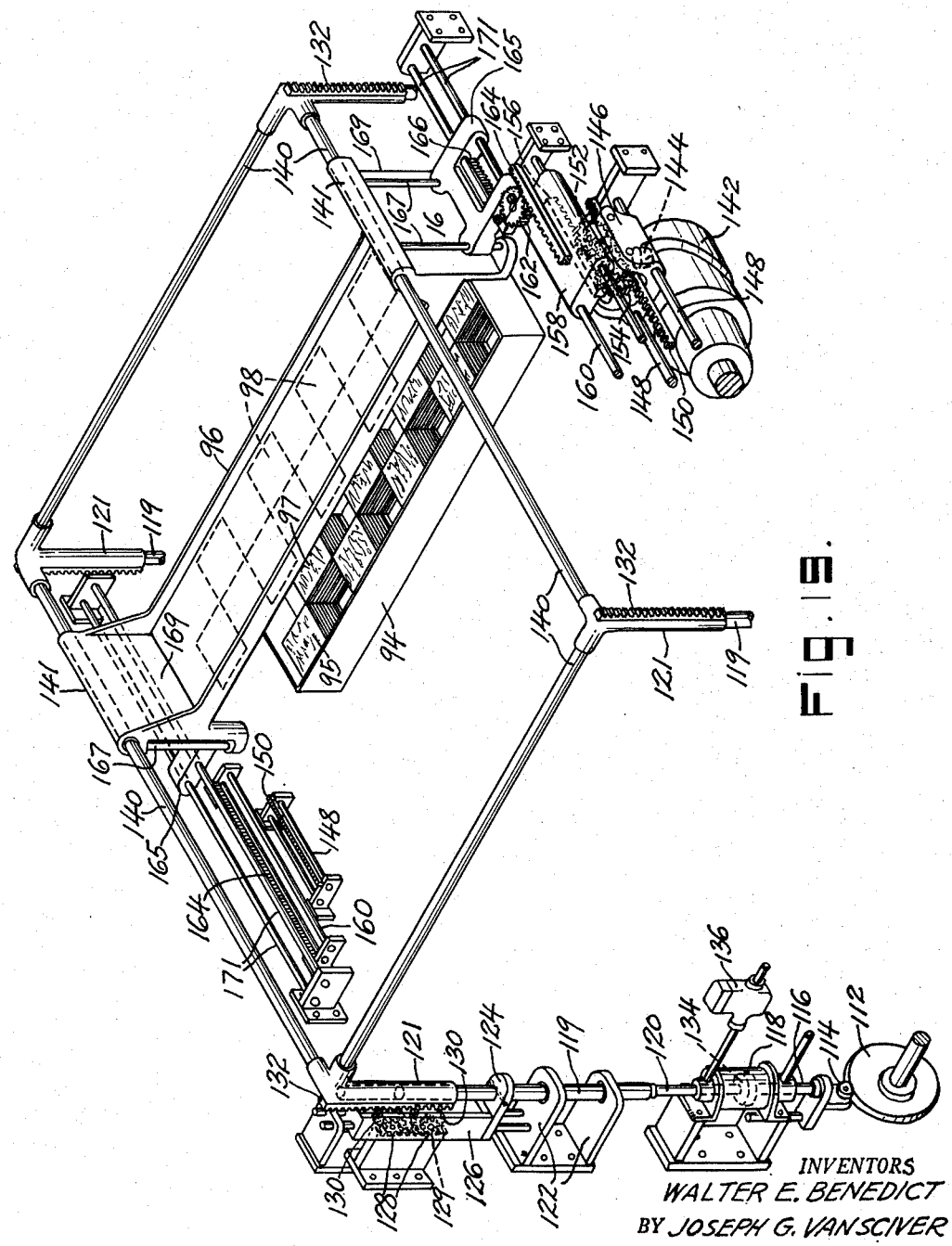
Fig. 19 is a perspective illustrating further details of the transfer mechanism shown in Figs. 10, 11 and 12.

As shown in Fig. 1 two or more transfer or setting units, indicated generally at 85 and 87, are positioned above the table 86 and are each provided with a tray 94 as shown in Figs. 12 and 19 upon which are arranged stacks of cut pieces of composition as shown at 95 and 97 to be placed in the spaces between the pieces 38 and 40 which were set on the backing by the rotary cutter. These stacks are preferably arranged in two rows and spaced apart in positions corresponding to the spaces left between the pieces 38 and 40 which are carried by the backing. Transfer heads 96 extend transversely above the table 86 and are each provided with a plurality of lifting heads 98 located in position to lift the topmost cut piece from each stack and lower it into place in the openings provided therefor between the pieces 38 and 40 which were set by the cutter roll.

Figure 10:
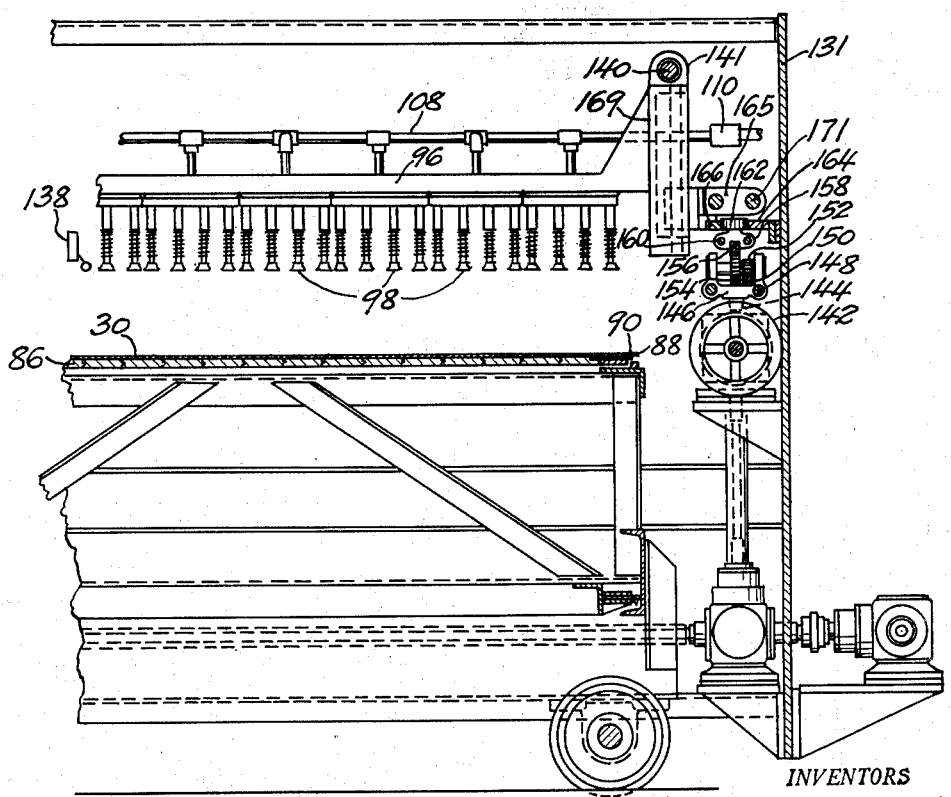
Fig. 10 is a vertical sectional view taken on the line 10—10 of Fig. 2 showing a typical form of transfer device embodied in the machine of Fig. 1.

As shown in Figs. 10 and 13 each lifting head is provided with a plurality of rubber or plastic suction cups 100 mounted on tubular shafts 102 which are urged to projected position by springs 104 but readily yieldable to accommodate themselves to varying height of the stacks of cut pieces and to avoid pressing the pieces being deposited on the backing with undue force. The shafts 102 are slidable with the sleeves 106 which are connected to the vacuum lines 108 shown in Fig. 10. The vacuum is controlled by suitable valve means indicated generally at 110 to cause vacuum to be impressed on the line when the suction cups 100 have engaged the stacked pieces on the tray 94 and to maintain such vacuum until the uppermost piece from each stack has been removed and deposited in the proper location on the backing 30 corresponding to the pieces 42 and 44 of the completed assembly.

Thereupon the vacuum is released and the lifting heads raised to pick up and deposit other cut pieces so that the design can be assembled progressively and continuously as the operation continues. The control of valve means 110 may be effected by any suitable means such as a microswitch and feeler indicated at 138 in Fig. 13.

The transfer head 96 which carries the lifting heads 98 is raised and lowered by suitable means such as the lifting cams 112 located on opposite sides of the machine and engaged by the cam followers 114 on the shaft 116. A hydraulic cylinder 118 is interposed between shaft 116 and a shaft 120 and has an enlarged upper end portion 119 which is vertically movable in guides 122. A bracket 124 is secured to the portion 119 so that on upward movement of the shaft a pinion carrying frame 126 engaging bracket 124 will be raised. The frame 126 supports the pinions 128 which engage a stationary rack 129 on the side frame 131 of the machine. Larger pinions 130 are fixed to the pinions 128 and engage rack bar 132 secured to the tubular corner post 121 of the transfer head 96. Thus limited movement of shaft 120 serves to impart a multiplied movement to the lifting head. At the same time the head is guided in its vertical movement by the telescoping arrangement of the corner posts 121 with respect to the enlarged upper end portions 119 of shafts 120.

The hydraulic cylinder 118 encloses a piston 134 to which the shafts 116 and 120 are fixedly connected. Valve means indicated generally at 136 operate to prevent movement of the piston within the cylinder when the head is being raised thus insuring positive lifting of the transfer head by cam 112 and shafts 116 and 120. However, lowering of the head is controlled in part by movement of the piston 134 within its cylinder. For this purpose one or more of the lifting heads carries a microswitch or feeler 138 positioned to be actuated by contact with a cut piece of composition when the springs which hold the suction cups in projected position are partially compressed. On contact of the feeler 138 with a cut piece in either lifting it from the stacks 95 or 97 or when depositing it on the backing 30 the hydraulic system is actuated to move piston 134 and prevent further downward movement of the head 96. The head is thus held in a raised position when necessary so that the follower and the head 96 are not positively lowered with the cams 112 as they rotate and the suction cups do not press unduly against the cut composition on either the stacks 95 and 97 or in depositing them on the backing 30.

For example, the transfer head when over the stacks 95 and 97 is lowered as the follower 114 rides on the cam 112 and until the suction cups 100 engage the cut pieces on the top of each stack. The springs 104 are compressed as the head 96 continues to descend and until the microswitch 138 is actuated. The hydraulic system then is actuated to move piston 136 within the cylinder 118 and hold the head 96 elevated while cam 112 continues to rotate, falling away from follower 114. Thereafter when the cam 112 rotates far enough to engage follower 114 again the head is lifted raising the topmost cut pieces from the stacks 95 and 97. The head is then lowered to set the pieces thus removed from the stacks into position on the backing 30. During such downward movement the follower 114 continues to engage the cam 112 until the cut pieces have been set in place and springs 104 compressed sufficiently to allow the microswitch 138 to be actuated again. When this occurs the head is held against continued downward movement by the action of piston 136 in cylinder 118 and remains lowered until positively raised by continued rotation of cam 112 concluding a cycle of operation.

In order to move the transfer head lengthwise of the machine so that it will travel with the continuously moving web 30 when setting the cut pieces in place thereon, the head is provided with a tubular bearing member 139 mounted for longitudinal sliding movement on the guide bars 140. A barrel cam 142 actuates the head through the follower 144 on carriage 146. The carriage is slidable on bars 148 and provided with a rack 150 engaging small pinions 152 to which larger pinions 154 are fixed. The latter pinions engage a rack 156 mounted on a second carriage 158 slidable on bars 160. In this way it is possible to multiply the movement of the head while providing for only limited longitudinal movement directly from the barrel cam. Further multiplied movement is also effected by providing the second carriage 158 with a pinion 162 engageable on one side with a stationary rack 164 mounted on the side from 131 of the machine and engaging on the opposite side with a rack 166 fixed to a bracket 165 which is vertically movable on guide rods 167 carried by end portion 169 of the transfer head 96 and horizontally movable on guide rods 171 mounted on side frame 131. The head 96 is thus movable vertically with respect to the machine while the racks 162 and 164 are held constantly in engagement with pinion 162 for longitudinal movement in multiplying the action of the barrel cam 142 as it moves the carriage 146 lengthwise of the machine.

The latter multiplied movement makes it possible to move the transfer head back and forth over the stacked pieces of composition instead of moving the tray 94 containing the stacks 95 and 97. The tray can then be accurately fixed in position to insure proper placement of the pieces on the backing material. As shown in Fig. 12 the tray may be provided with guide flanges 168 bearing against vertically and laterally positioned guide rollers 170 which allow an empty tray to be removed and a filled tray to be inserted into the machine in accurately determined position for insuring continued operation and uniformity of the product being produced.

The stacks of cut pieces may of course be arranged differently and they may be changed in color at will in order to produce a different pattern with a minimum delay or in fact no delay at all. Thus, for example, while the squares 38 and 40 placed on the backing by the rotary cutter continue to be cut from a sheet of red calendered composition, the squares 42 and 44 deposited on the backing by the transfer device 85 may be white, or black or may be changed in color with each new tray 94 or may even be alternate or vary within the stacks 95 and 97.

By providing two transfer devices 85 and 87 it is possible to make the design of Fig. 9 or that of Fig. 18 from previously cut pieces of composition without operating the rotary cutter. If desired, both transfer heads may be used together with the rotary cutter to produce other types of patterns including those which embody irregular design elements, preformed, flat pressed, embossed or substantially any type of element required for a multitude of patterns.

An important type of pattern which may be produced when using machines of the type illustrated in Fig. 1 is that shown in Fig. 18 wherein the individual elements are generally similar in appearance and are cut from a single calendered sheet but certain elements are oriented in position with respect to other elements of the assembly. As shown the elements are directional in character being striated but spaced elements 172 and 174 extend at right angles to alternate elements 176 and 178.

When producing a pattern of this character all of the elements may be cut from the composition sheet 4 by the rotary cutter 14 using diagonally arranged cutting knives so that the striations in the tile simulating elements run diagonally thereof. These elements are all deposited on the web of backing 30 but only the alternate elements 172 and 174, for example, are secured to the backing by the adhesive. The intervening blocks or tile indicated at 176 and 178 are merely set in place on the backing web but are not secured thereto. The stripping device 28 is not required when producing the design of Fig. 18 and therefore may remain inoperative.

When the blocks have been deposited on the backing by the rotary cutter in the manner described previously the assembly is passed on to a block turning mechanism indicated generally at 180 which serves to lift those blocks of the assembly, such as 176 and 178, which are not adhered to the web by the adhesive and to rotate the blocks through a predetermined angle, say 90°, after which the blocks are replaced on the web in the same spot from which they were removed but with the design or decoration thereon oriented through 90° from the design or decoration on adjacent blocks which were not so lifted, turned and reset. Blocks or tile cut from a sheet of calendered composition having a striated, marble, jaspe or other directional pattern such as those produced by the method described in the application of Benedict et al. Serial No. 191,442 filed October 21, 1950, can thus be arranged with alternate or selected blocks oriented to relieve the appearance and present an interesting tile simulating design.

The block turning mechanism is preferably located between the rotary cutter 14 and the first of the tile setting units as shown diagrammatically in Fig. 1. As shown in more detail in Figs. 14, 15 and 16, the block turning mechanism includes a cross head 182 mounted on a frame 184 which is movable vertically toward and away from the table 86 and is guided in its movement by the guide rods 186 located near the corners of the frame 184. The guide rods are secured at their lower ends to the table 86 and are secured at their upper ends to a head frame 188. Vertical movement of the frame 184 and cross head 182 is effected by means of cams 190 which are mounted on a shaft 192 near the opposite sides of the machine and driven by bevel gears 194. Cam followers 196 are mounted on the end brackets 198 secured to the opposite ends of the vertically movable frame 184 and engage the cams 190 to raise and lower the frame and cross head in timed relation to movement of the web of backing material and blocks of linoleum composition travelling along the table 86.

The cross head 182 is movable horizontally lengthwise of the machine and with respect to the frame 184 by means of the slides 200 mounted on the horizontal rods 202 located adjacent the opposite ends of the frame 184 and supporting the cross head 182. Horizontal movement of the cross head is effected by means of bell cranks 204 pivotally mounted at 206 on the bed of the machine and having their long arms 208 connected to the slides 200 by links 210. The shorter arm 212 of each bell crank is provided with a follower 214 which engages a cam 216 mounted on the shaft 192.

The cross head 182 carries lifting heads 218 which preferably are provided with suction cups 220 and connected to a vacuum line 222. The arrangement of the cams 190 and 216, and the timing of the operations with the movement of the backing material and blocks of composition over the table 86 is such that the lifting heads are lowered into engagement with those blocks on the web of backing material 30 which are not secured in place by the adhesive 37. The free blocks, such as 172 and 174 of Fig. 18, are raised from the backing and moved forward as the web advances and then lowered again into place on the same spots from which they were removed. Thereafter vacuum is released and the cross head 182 and lifting heads 218 are raised and returned to their original position in time to lift other blocks from the web without interrupting the advance of the assembled web of backing material and cut blocks of linoleum composition.

In order to orient the blocks of composition which are thus raised before resetting them on the backing to produce the pattern of Fig. 18, the lifting heads 218 are provided with pinions 224 engaged by racks 226 which extend lengthwise of the cross head 182. The racks 226 are moved back and forth to rotate the lifting heads by means of the stationary cam members 228 and 230 which are mounted on the opposite ends of the frame 184 and engaged by rollers 232 secured to the ends of the racks 226 by brackets 234. The cam members 228 and 230 are symmetrically but oppositely formed to cause the racks to move back and forth lengthwise of the cross head as the cross head itself is moved lengthwise of the machine along the horizontal rods 202 under the action of cams 216 and bell cranks 204.

In this way the free blocks 176 and 178 of the assembly shown in Fig. 18 are raised leaving blank spaces between the blocks 172 and 174 which are secured to the backing by adhesive. As the web carrying the latter blocks advances, the blocks raised by the lifting heads 218 are rotated during the horizontal movement of the cross head through the action of the cam members 228 and 230 in shifting the racks 226 to rotate the pinions 224 on the lifting heads. Thereafter when the lifting heads are lowered they deposit the new oriented blocks 176 and 178 in the spaces from which they were removed. The pattern of Fig. 18 is thus completed and the assembly may be passed to a press such as a roll or platten press for finally bonding the design elements to the backing and to each other.

The pattern of Fig. 18 may of course be produced by pre-cutting the blocks and arranging all of them in predetermined positions on the trays 94 of the transfer devices 85 and 87 or in the alternative elements 176 and 178 may be stripped from the cutter roll by the stripping mechanism 28 and these may be arranged in oriented positions on the tray of one transfer device and deposited in the spaces from which they were removed by operation of the transfer heads.

By using all of the elements of the machine illustrated in Fig. 1, additional and intricate patterns may be produced as exemplified by Fig. 17 in which the squares of linoleum indicated at 244 as well as the squares indicated at 246 may be cut from the calendered sheet of linoleum 4 with the pieces 246 oriented through an angle of 90° from the elements 244 by operation of the element turning device 180. The cut pieces indicated at 240 and 242 may be arranged on the web of backing material or travelling support for the assembly by means of the transfer device 85, whereas the centrally located design elements indicated at 248 and 250 may be made up of preassembled straight line or moulded inlaid elements and arranged on the web of backing material by the transfer device 87. When producing such a pattern the strippers 28 will serve to remove from the rotary cutter those portions of the calendered sheet corresponding to the units 240, 242, 248 and 250 and only the elements 244 will be adhesively bonded to the web of backing material. After passing the rotary cutter the elements 246 will be rotated to the position indicated and as the material moves on beneath the transfer device 85 the elements 240 and 242 will be placed in position leaving the central portion of the pattern blank. The elements 248 and 250 will then be inserted into place to complete the design by means of the transfer device 87.

Thus, varied and intricate patterns may be produced using the machine illustrated in Fig. 1 and changes in design can be made readily by simple replacement or adjustment of the cams and control elements used in actuating the variously operating devices of the assembly. Moreover, the rotary cutter may be formed to produce cut pieces having various shapes other than tile simulating elements and these may be removed, oriented or replaced to produce substantially any type of pattern sought by the manufacturer. The operation is continuous and yet the pattern may be varied quickly and easily without the expense heretofore encountered in changing from one pattern to another in the manufacture of inlaid linoleum products by machines.

The order and arrangement of the devices within the machine can also be varied. Thus, the element turning device may be located after the transfer devices to rearrange elements deposited on the backing material by either the rotary cutter or the transfer devices. At the same time anyone or more of the units within the machine may be rendered inoperative when it is not needed for producing a particular pattern being manufactured. It will thus be apparent that the applicant's machine is capable of numerous changes and modifications without departing from the principle involved. In view thereof it should be understood that the particular form and arrangement of elements shown in the drawings and herein described are intended to be illustrative only and are not intended to limit the scope of the invention.

What is claimed:

1. A machine for producing inlaid linoleum in a continuous operation comprising means for moving a supporting web of material continuously through the machine, means for depositing design elements formed of linoleum composition on said web in predetermined positions, a device movable into and out of contact with elements carried by said web for lifting, rotating and resetting selected elements on said web and means for moving said device lengthwise of the machine to travel with said web during contact thereof with elements supported by said web.

2. A machine for producing inlaid linoleum in a continuous operation comprising means for moving a supporting web continuously through said machine, a plurality of devices spaced longitudinally of the machine for depositing design elements on said web in predetermined positions, and means for moving said devices lengthwise of the machine with said web during the operation of depositing elements on said web.

3. A machine for producing inlaid linoleum comprising a flat bed, means for continuously moving a web of supporting material lengthwise over said bed, a plurality of devices spaced lengthwise of said bed and movable toward and away from said bed to deposit design elements on said web in predetermined positions, and means for moving said devices with said web and lengthwise of said bed during the operation of depositing elements on said web.

4. A machine for producing inlaid linoleum comprising a flat bed, means for continuously moving a web of material lengthwise over said bed, means for depositing design elements on said web, and means engageable with elements carried by said web for rearranging said elements while the web is in motion.

5. A machine for producing inlaid linoleum comprising a flat bed, means for continuously moving a web of material lengthwise over said bed, means for depositing design elements on said web, means movable toward and away from said web and having lifting heads thereon to engage and raise selected elements from said web, and means for moving said lifting heads to rearrange elements carried thereby and to reset the lifted elements on said web in rearranged positions while the web is in motion.

6. A machine for producing inlaid linoleum comprising a flat bed, means for continuously moving a web of material lengthwise over said bed, means for depositing design elements on said web, means movable toward and away from said web and having lifting heads thereon to engage and raise selected elements from said web, and means for moving said lifting heads to rearrange elements carried thereby and to reset the lifted elements on said web in oriented position but in the same location on the web from which the elements were lifted.

7. A machine for producing inlaid linoleum comprising a flat bed, means for continuously moving a web of material lengthwise over said bed, means for applying adhesive to selected areas of said web, means for depositing design elements on said web in said selected areas and in other areas, and means engageable with those design elements deposited in said other areas for raising and rearranging said elements.

8. A machine for producing inlaid linoleum comprising a flat bed, means for continuously moving a web of material lengthwise over said bed, means for applying adhesive to selected areas of said web, means for depositing design elements on said web in said selected areas and in other areas, and lifting heads movable toward and away from said web and positioned to engage those elements deposited in said other areas, means for rotating said lifting heads together with elements carried thereby and means for lowering said lifting heads to return elements which have been lifted and rotated to the same location on said web from which they were lifted.

9. A machine for producing inlaid linoleum comprising a flat bed, means for continuously moving a web of material lengthwise over said bed, means for applying adhesive to selected areas of said web, means for depositing design elements on said web in said selected areas and in other areas, and lifting heads movable toward and away from said web and positioned to engage those elements deposited in said other areas, means for rotating said lifting heads together with elements carried thereby and means for lowering said lifting heads to return elements which have been lifted and rotated to the same location on said web from which they were lifted, and means for moving said lifting heads with said web and lengthwise of the machine during contact of said heads with elements engaging said web.

10. A machine for producing inlaid linoleum products comprising means for continuously moving a web of material lengthwise through the machine and a series of element handling devices arranged in spaced relation lengthwise of the machine in position to deposit design elements thereon in selected positions, one of said devices being operable to lift, turn and reset a design element deposited on said web by a preceding device.

11. A machine for producing inlaid linoleum products comprising means for continuously moving a web of material lengthwise through said machine, means for feeding a calendered sheet of linoleum composition to said machine, a rotary cutter engageable by said sheet to sever design elements therefrom, said cutter being movable to deposit cut design elements on said web, and means engageable with elements deposited on said web by said cutter for rearranging said elements.

12. A machine for producing inlaid linoleum products comprising means for continuously moving a web of material lengthwise through said machine, means for feeding a calendered sheet of linoleum composition to said machine, a rotary cutter engageable by said sheet to sever design elements therefrom, said cutter being movable to deposit cut design elements on said web, and means engageable with elements deposited on said web by said cutter lifting, turning and resetting said design elements in the same location but oriented in position.

13. A machine for producing inlaid linoleum products comprising a flat bed, means for continuously moving a web of backing material over said bed, means for supplying a sheet of calendered linoleum composition to said machine, a rotary cutter engageable by said sheet to sever design elements therefrom, stripping means for removing from said cutter portions of said sheet not required for the pattern being produced, said cutter being positioned to deposit required elements on said web in predetermined positions, transfer means for depositing other design elements on said web in areas between those deposited by said cutter to complete a pattern, said transfer means being supplied with previously cut design elements and being movable with said web and lengthwise of the machine in depositing elements on said web.

14. A transfer device for depositing previously cut design elements on a continuously moving web of backing material comprising a tray for holding stacks of design elements, lifting heads carried by said transfer device and movable toward and away from said web, means on the lifting heads engageable with the topmost elements in stacks thereof carried by said tray, means for positively moving said transfer heads into position above said stacks, and means movable with said lifting heads and engageable with a design element on downward movement of said heads for interrupting such downward movement.

15. The method of making inlaid linoleum products which comprise the steps of depositing a plurality of design elements on a web of backing material and thereafter lifting and turning selected elements and resetting them in the same location from which they were removed.

16. The method of making inlaid linoleum products which comprises the steps of passing a sheet of calendered linoleum composition to a rotary cutter, transferring design elements cut from said sheet from the cutter to a web of backing material, lifting certain of said elements from the web of backing and turning them through an angle of 90° and thereafter resetting the turned elements on said web in the same location from which they were lifted.

17. In a machine for use in producing inlaid linoleum means for depositing cut pieces of linoleum composition on a web of supporting material, means for moving said web with the cut pieces of linoleum thereon lengthwise through the machine, a member extending transversely of said web and movable longitudinally of said machine, a plurality of lifting heads on said member, means for alternately lowering and raising said heads to engage and lift selected pieces of linoleum composition on said web and thereafter reset the lifted pieces on said web, means for rotating said lifting heads and the cut pieces of linoleum composition carried thereby while in a raised position, and means coordinating the movement of said heads and web to cause the turned cut pieces to be reset on said web in the same location but in a position oriented from that in which they were when lifted.

18. The combination comprising a rotary cutter having cutting means thereon arranged to sever design elements from a sheet of linoleum composition, ejecting means for raising an unwanted design element severed from a sheet by said cutting means above the adjacent surface of said cutter and stripping means pivotally movable toward and away from said cutter and having means thereon to engage and lift said element from said ejecting means on movement of the stripper toward the cutter and to discharge said element on movement of the stripper away from the cutter.

19. The combination comprising a rotary cutter having cutting means thereon arranged to sever design elements from a sheet of linoleum composition, ejecting means for raising an unwanted design element severed from a sheet by said cutting means above the adjacent surface of said cutter and stripping means pivotally movable toward and away from said cutter and having an extremity movable into position beneath a design element thus raised to remove the same from the ejecting means.

20. The combination comprising a rotary cutter having cutting means thereon arranged to sever design elements from a sheet of linoleum composition, ejecting means for raising an unwanted design element severed from a sheet by said cutting means above the adjacent surface of said cutter and stripping means pivotally movable toward and away from said cutter and having an extremity movable into position beneath a design element thus raised to remove the same from the ejecting means, and gripping means carried by the stripper and movable to grip a design element stripped from said ejecting means by said stripper, and means for releasing said gripping means to permit discharge of said element from the stripper on movement of said stripper away from the cutter to an element releasing position.

WALTER E. BENEDICT.
JOSEPH G. VAN SCIVER.

References Cited in the file of this patent

UNITED STATES PATENTS

| Number | Name | Date |
| --- | --- | --- |
| 626,117 | Walton | May 30, 1899 |
| 629,281 | Walton | July 18, 1899 |
| 2,080,386 | Fischer | May 11, 1937 |